(12) United States Patent
Holmdahl et al.

(10) Patent No.: US 11,712,629 B2
(45) Date of Patent: Aug. 1, 2023

(54) DETERMINING GAME QUALITY BASED ON GAMEPLAY DURATION

(71) Applicant: Roblox Corporation, San Mateo, CA (US)

(72) Inventors: Eric Holmdahl, San Francisco, CA (US); Nikolaus Sonntag, Foster City, CA (US); Xusheng Sun, San Mateo, CA (US); Aman Thakur, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 57 days.

(21) Appl. No.: 17/011,537

(22) Filed: Sep. 3, 2020

(65) Prior Publication Data

US 2022/0062772 A1    Mar. 3, 2022

(51) Int. Cl.
*A63F 13/77* (2014.01)
*A63F 13/46* (2014.01)

(52) U.S. Cl.
CPC .............. *A63F 13/77* (2014.09); *A63F 13/46* (2014.09)

(58) Field of Classification Search
CPC ................................. A63F 13/77; A63F 13/46
See application file for complete search history.

(56) References Cited

U.S. PATENT DOCUMENTS

| | | | | |
|---|---|---|---|---|
| 11,158,346 B2* | 10/2021 | Sundareson | ........... | H04L 67/535 |
| 2010/0035689 A1* | 2/2010 | Altshuler | ............... | A63F 13/86 |
| | | | | 463/39 |
| 2011/0124417 A1* | 5/2011 | Baynes | ................. | A63F 13/798 |
| | | | | 463/43 |
| 2016/0001181 A1* | 1/2016 | Marr | .................... | G07F 17/3227 |
| | | | | 463/42 |
| 2016/0148463 A1 | 5/2016 | Gadher et al. | | |
| 2016/0166935 A1* | 6/2016 | Condrey | ................. | A63F 13/48 |
| | | | | 463/31 |

(Continued)

OTHER PUBLICATIONS

Chris Chambers, et al., "Measurement-based Characterization of a Collection of On-line Games," USENIX Association; Internet Measurement Conference, https://www.usenix.org/legacy/events/imc05/tech/full_papers/chambers/chambers_html/paper.html, Aug. 10, 2005, 14 pages.

(Continued)

*Primary Examiner* — Seng H Lim
(74) *Attorney, Agent, or Firm* — IP Spring

(57) ABSTRACT

Some implementations relate to methods, systems, and a computing device to generate predicted scores for games based on gameplay duration. In some implementations, a method includes obtaining game session data that includes a respective session duration for each game session of a plurality of game sessions, each game session associated with a respective game and a respective game player. The method further includes grouping the plurality of games game clusters based on the game session data, each game cluster including one or more of the games such that no game is in more than one cluster. The method further includes generating a predicted score for one or more of the games and identifying at least one game as a high quality game based on the predicted score. In some implementations, generating the predicted store includes determining a distance between each game and the decision boundary.

20 Claims, 7 Drawing Sheets

(56) References Cited

U.S. PATENT DOCUMENTS

2017/0287287 A1\* 10/2017 Froy ................... G07F 17/3211
2017/0339192 A1 11/2017 Veeramachaneni et al.
2020/0005196 A1 1/2020 Cai et al.

OTHER PUBLICATIONS

WIPO, International Search Report for International Patent Application No. PCT/US2021/047467, dated Dec. 6, 2021, 2 pages.
WIPO, Written Opinion for International Patent Application No. PCT/US2021/047467, dated Dec. 6, 2021, 6 pages.

\* cited by examiner

DETERMINING GAME QUALITY BASED ON GAMEPLAY DURATION

Embodiments relate generally to computer-based gaming, and more particularly, to methods, systems, and computer readable media to generate predicted scores for games based on gameplay duration.

BACKGROUND

Some online gaming platforms enable users to connect with each other, interact with each other (e.g., within a game), create games, and share information with each other via the Internet. Users of online gaming platforms may participate in multiplayer gaming environments (e.g., in virtual three-dimensional environments), design characters and avatars, decorate avatars, exchange virtual items/objects with other users, communicate with other users using audio or text messaging, and so forth.

A game platform may highlight games and/or suggest games to users. Users may browse and/or search for games based on their interests to discover suitable games for playing. For example, users may browse games by categories (e.g., action, racing, puzzle, strategy, popular, trending, new, etc.) or search games by keywords or concepts (e.g., "car chase, "board game," etc.).

SUMMARY

Implementations described herein relate to generation of predicted scores for games based on gameplay duration. In some implementations, a computer-implemented method includes obtaining game session data that includes a respective session duration for each game session of a plurality of game sessions, each game session associated with a respective game of a plurality of games and a respective game player.

In some implementations, the method further includes grouping the plurality of games into a plurality of game clusters based on the game session data, each game cluster including one or more of the plurality of games such that no game is in more than one cluster of the plurality of game clusters, generating a predicted score for one or more of the plurality of games, and identifying at least one game of the plurality of games as a high quality game based on the predicted score.

In some implementations, the method further includes analyzing the game session data to determine a distribution of session durations for each game based on a percentage of game sessions that are associated with a respective length of time. In some implementations, the grouping of the plurality of games is based on the distribution of session durations.

In some implementations, the distribution of session durations for each game is a Weibull distribution. In some implementations, the analyzing comprises determining parameters of the Weibull distribution.

In some implementations, the method further includes receiving quality scores for a subset of the plurality of games wherein the subset excludes at least one of the plurality of games. In some implementations, generating the predicted score for each game is based on a particular cluster that the game belongs to and quality scores associated with other games in the particular cluster.

In some implementations, the grouping and generating the predicted score are performed by applying a machine learning model. In some implementations, the method further includes receiving quality scores for a subset of the plurality of games wherein the subset excludes at least one of the plurality of games, and training the machine learning model using supervised learning, wherein feedback is provided to the machine learning model based on a comparison between a predicted score for each game in the subset and the quality score for each game in the subset.

In some implementations, the method further includes providing a user interface that includes the at least one game identified as the high quality game. In some implementations, providing the user interface is performed for a particular game player and wherein the at least one game is included in the user interface based at least in part on an age associated with a user account of the particular game player.

In some implementations, the grouping the plurality of games includes grouping the plurality of games into two game clusters separated by a decision boundary, and wherein generating the predicted store for each of the one or more of the plurality of games includes determining a distance between the each game and the decision boundary, wherein the distance is based on two or more parameters associated with the each game, the parameters being based on the game session data for the each game. In some implementations, the grouping is further based on one or more of: an age, a location, a gender, or a language associated with a game player for each game session.

Some implementations include a computing device comprising a processor; and a memory coupled to the processor, with instructions stored thereon that, when executed by the processor, cause the processor to perform operations comprising: obtaining game session data that includes a respective session duration for each game session of a plurality of game sessions, each game session associated with a respective game of a plurality of games and a respective game player, grouping the plurality of games into a plurality of game clusters based on the game session data, each game cluster including one or more of the plurality of games such that no game is in more than one cluster of the plurality of game clusters, generating a predicted score for one or more of the plurality of games, and identifying at least one game of the plurality of games as a high quality game based on the predicted score.

In some implementations, the operations further include analyzing the game session data to determine a distribution of session durations for each game based on a percentage of game sessions that are associated with a respective length of time, and wherein the grouping of the plurality of games is based on the distribution of session durations. In some implementations, the distribution of session durations for each game is a Weibull distribution, and the analyzing comprises determining parameters of the Weibull distribution.

In some implementations, the operations further include receiving quality scores for a subset of the plurality of games wherein the subset excludes at least one of the plurality of games, and wherein generating the predicted score for each game is based on a particular cluster that the game belongs to and quality scores associated with other games in the particular cluster.

In some implementations, the grouping the plurality of games includes grouping the plurality of games into two game clusters separated by a decision boundary, and generating the predicted store for each of the one or more of the plurality of games comprises determining a distance between the each game and the decision boundary, wherein the distance is based on two or more parameters associated with the each game, the parameters being based on the game session data for the each game.

In some implementations, the operations further include receiving quality scores for a subset of the plurality of games wherein the subset excludes at least one of the plurality of games, and training the machine learning model using supervised learning, wherein feedback is provided to the machine learning model based on a comparison between a predicted score for each game in the subset and the quality score for each game in the subset.

Some implementations include a system that includes a memory with instructions stored thereon; and a processing device, coupled to the memory, the processing device configured to access the memory and execute the instructions, wherein the instructions cause the processing device to perform operations including: obtaining game session data that includes a respective session duration for each game session of a plurality of game sessions, each game session associated with a respective game of a plurality of games and a respective game player; grouping the plurality of games into a plurality of game clusters based on the game session data, each game cluster including one or more of the plurality of games such that no game is in more than one cluster of the plurality of game clusters; generating a predicted score for one or more of the plurality of games; and identifying at least one game of the plurality of games as a high quality game based on the predicted score.

In some implementations, the operations further include analyzing the game session data to determine a distribution of session durations for each game based on a percentage of game sessions that are associated with a respective length of time, and wherein the grouping of the plurality of games is based on the distribution of session durations.

In some implementations, the operations further include providing a user interface that includes the at least one game identified as the high quality game.

In some implementations, grouping the plurality of games comprises grouping the plurality of games into two game clusters separated by a decision boundary, and wherein generating the predicted store for each of the one or more of the plurality of games comprises determining a distance between the each game and the decision boundary, wherein the distance is based on two or more parameters associated with the each game, the parameters being based on the game session data for the each game.

DETAILED DESCRIPTION

Figure 1:
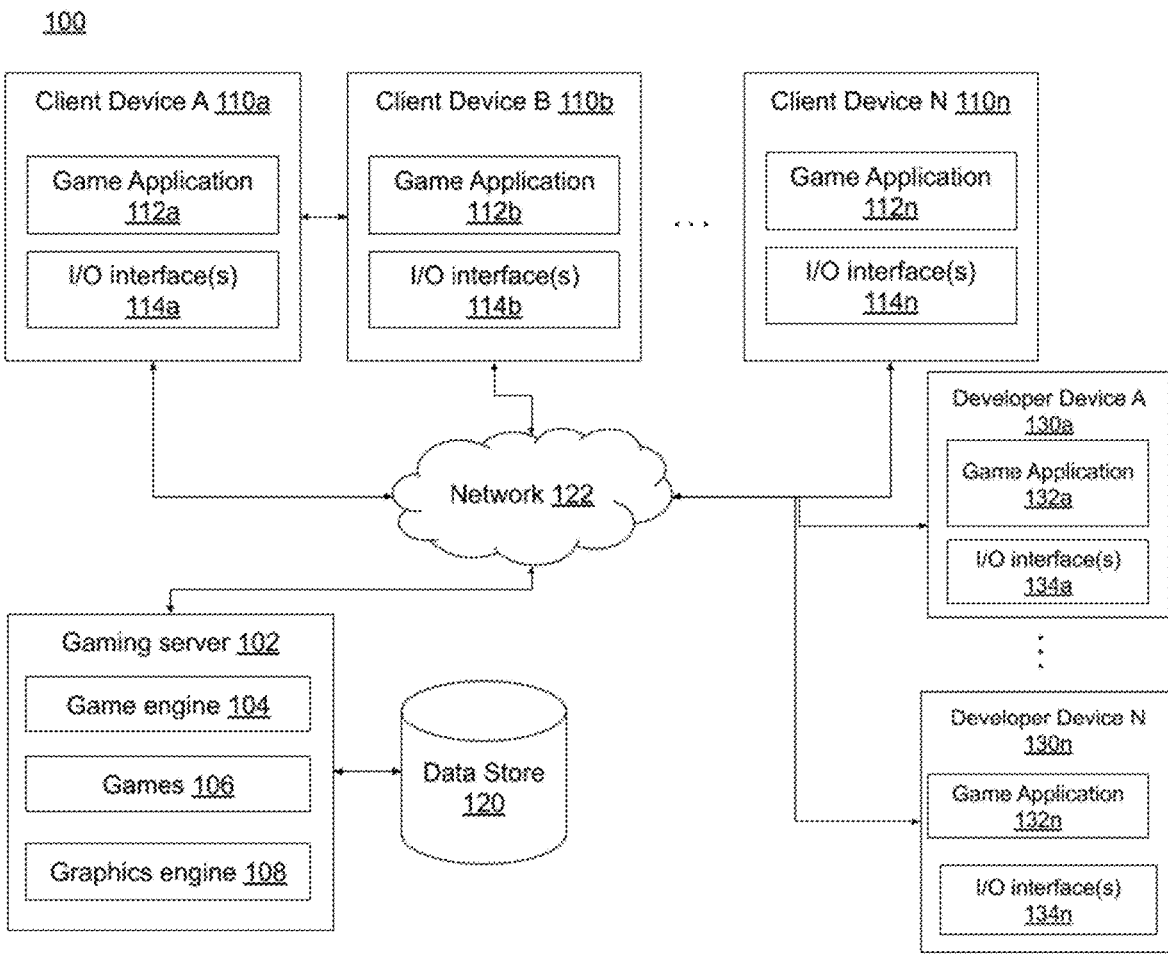
FIG. 1 is a diagram of an example system architecture to generate predicted scores for games, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

An online gaming platform may also allow users (developers) of the platform to create new games and/or characters. For example, users of the online gaming platform may be enabled to create, design, and/or customize new characters (avatars), new animation packages, and make them available to other users.

Users may play games in gameplay sessions as solo participants, and/or in groups. Multiple instances of gameplay sessions of a game may be initiated at the same time, and at different times by a player or groups of players. A user may participate in multiple gameplay sessions of the same game or participate in gameplay sessions of different games at the same time. Users may include playing participants as well as observer (viewer) participants. During gameplay sessions, participants may communicate with one another via a variety of communication channels (ways) such as text messaging, group chats, voice messages, etc.

The gaming platform (also referred to as game platform) enables users to select and play games from games included in the gaming platform. Users may select games to play by conducting a search by game title, keywords, game themes, game categories, etc. Users may also select games to play by browsing available games. The gaming platform may enable user selection of games by presenting a curated list of games to the user. For example, the gaming platform may highlight games that have high number of active players at a particular time in a list of "currently popular" games, games that have a large number of players that joined within a recent time window in a list of "trending" games, games that have been newly made available on the platform in a list of "fresh" games, games that have high ratings from the users as "top-rated" games, "top-favorited" games that are marked as a favorite by a large number of users, etc. Such lists may be platform-wide and/or specific to geographic locations, and/or specific to a user or a category of users, and/or specific to individual game categories such as "puzzle, "action adventure," "social," etc.

Games may be categorized based on their type and/or gameplay style. In some implementations, games can be organized by one or more of gameplay characteristics, objective type (e.g., build an object; reach a milestone; participate in a virtual environment; etc.), and subject type (e.g., sports, challenge, action, racing, puzzle, etc.). The category may be labeled by one or more text tags associated with the game. Games may also be associated with a predicted score that is indicative of the game quality. The predicted scores may be utilized to rank the games, and/or to curate and present selected lists of games to users.

Other users (players) may discover games to play by browsing or based on a search. The search may be performed by name or by category, and the user may select a game they wish to play based on a list of games displayed. In some implementations, games likely of interest to the player are surfaced and displayed to the user, for example, at a time of login to the game platform or resumption of a session at the game platform by a player.

Some high quality games may not be discovered by sufficient users for various reasons. For example, if a game developer does not associate keywords or associates a low number of keywords with the game, discovery of their game may be difficult for users that rely on a keyword search. In another example, if the keywords associated with a game are also associated with a large number of other games, the game may not appear in the search listing or may appear in a lower ranked position, such that not many players join the game.

In another example, an initial low rank (e.g., by users who tried the game but didn't enjoy it) may cause the game to not be promoted on the game platform. If the game is played by users that are unlikely to enjoy it (e.g., a complex game intended for teenage users being tried by younger users, or a simple game for younger users being tried by teenage and young adult users) may lead to negative feedback and thus, reduce the likelihood of the game being discovered by other users.

Such games may have a relatively low number of total gameplay sessions associated with the game. The low number of gameplay sessions of the game may cause the game to not appear in lists generated on the game platform, e.g. "trending games," "popular games," etc. Therefore, the likelihood of these games being discovered by users of the game platform may be lower.

In such cases, game developers may receive low rewards for their efforts in developing the game due to the relatively low number of users that play their game, with corresponding low numbers of sales on in-game items or subscription revenue. Further development of such games may then be curtailed by the game developer, affecting the overall game platform negatively.

Game players and game platform owners benefit from associating scores to various games. The scores can be utilized for ranking of games on the game platform and/or as input to recommender models, e.g. machine learning models, utilized on the game platform. For example, the recommender models can generate game recommendations for users based on scores associated with games.

The scores may be utilized to recommend games to users. The scores may be provided to machine learning models (e.g., a neural network based model) that provide game recommendations to users. A technical problem for game platform operators is the discoverability of games across the game platform(s).

On a game platform where most games are user-generated and a large number of games are available, the game platform may have limited information about each game. Thus, the game platform benefits from being able to determine the quality of each game, by using the quality information to improve search (e.g., by weighting higher quality games such that they appear earlier in search results), browsing (by including high quality games in various listings), etc. The number of games and gameplay sessions is a challenge in determination of game quality since many games may be similar in content or objective, while being very different in the quality of experience provided to game players.

Implementations are described herein to automatically generate a predicted score that is indicative of game quality for games on a game platform.

FIG. 1 illustrates an example system architecture 100, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online gaming server 102, data store 120, client devices 110a, 110b, and 110n (generally referred to as "client device(s) 110" herein), and developer devices 130a and 130n (generally referred to as "developer device(s) 130" herein). Gaming server 102, data store 120, client devices 110, and developer devices 130 are coupled via network 122. In some implementations, client devices(s) 110 and developer device(s) 130 may refer to the same or same type of device.

Online gaming server 102 can include, among other things, a game engine 104, one or more games 106, and graphics engine 108. A client device 110 can include a game application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a game application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online gaming server 102 can include a server having one or more computing devices (e.g., a cloud computing system, a rackmount server, a server computer, cluster of physical servers, etc.). In some implementations, the online gaming server 102 may be an independent system, may include multiple servers, or be part of another system or server.

In some implementations, the online gaming server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 102 and to provide a user with access to online gaming server 102. The online gaming server 102 may also include a website (e.g., a webpage) or application back-end software that may be used to provide a user with access to content provided by online gaming server 102. For example, users may access online gaming server 102 using the game application 112 on client devices 110.

In some implementations, gameplay session data are generated via online gaming server 102, game application 112, and/or game application 132, and are stored in data store 120. With permission from game players, gameplay session data may include associated metadata, e.g., game identifier(s); device data associated with the players; demographic information of the player(s); gameplay session identifier(s); chat transcripts; session start time, session end time, and session duration for each player; relative locations of participant avatar(s) within a virtual game environment; in-game purchase(s) by one or more player(s); accessories utilized by game players; etc.

In some implementations, online gaming server 102 may be a type of social network providing connections between users or a type of user-generated content system that allows users (e.g., end-users or consumers) to communicate with other users on the online gaming server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within games 106. The data store 120 may be utilized to store chat transcripts (text, audio, images, etc.) exchanged between players.

In some implementations, the chat transcripts are generated via game application 112 and/or game application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual game environment, accessories utilized by game participants, etc. In some implementations, the chat transcripts may include multilingual content, and messages in different languages from different gameplay sessions of a game may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 102 may be a virtual gaming server. For example, the gaming server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a game (e.g., 106) or the presentation of the interaction on a display or other output device (e.g., 114) of a client device 110.

In some implementations, a game 106 can include an electronic file that can be executed or loaded using software, firmware or hardware configured to present the game content (e.g., digital media item) to an entity. In some implementations, a game application 112 may be executed and a game 106 rendered in connection with a game engine 104. In some implementations, a game 106 may have a common set of rules or common goal, and the environment of a game 106 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 106 may be collectively referred to a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 102 can host one or more games 106 and can permit users to interact with the games 106 using a game application 112 of client devices 110. Users of the online gaming server 102 may play, create, interact with, or build games 106, communicate with other users, and/or create and build objects (e.g., also referred to as "item(s)" or "game objects" or "virtual game item(s)" herein) of games 106.

For example, in generating user-generated virtual items, users may create characters, decoration for the characters, one or more virtual environments for an interactive game, or build structures used in a game 106, among others. In some implementations, users may buy, sell, or trade game virtual game objects, such as in-platform currency (e.g., virtual currency), with other users of the online gaming server 102. In some implementations, online gaming server 102 may transmit game content to game applications (e.g., 112). In some implementations, game content (also referred to as "content" herein) may refer to any data or software instructions (e.g., game objects, game, user information, video, images, commands, media item, etc.) associated with online gaming server 102 or game applications. In some implementations, game objects (e.g., also referred to as "item(s)" or "objects" or "virtual objects" or "virtual game item(s)" herein) may refer to objects that are used, created, shared or otherwise depicted in game applications 106 of the online gaming server 102 or game applications 112 of the client devices 110. For example, game objects may include a part, model, character, accessories, tools, weapons, clothing, buildings, vehicles, currency, flora, fauna, components of the aforementioned (e.g., windows of a building), and so forth.

It may be noted that the online gaming server 102 hosting games 106, is provided for purposes of illustration. In some implementations, online gaming server 102 may host one or more media items that can include communication messages from one user to one or more other users. With user permission and express user consent, the online gaming server 102 may analyze chat transcripts data to improve the game platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 106 may be associated with a particular user or a particular group of users (e.g., a private game), or made widely available to users with access to the online gaming server 102 (e.g., a public game). In some implementations, where online gaming server 102 associates one or more games 106 with a specific user or group of users, online gaming server 102 may associated the specific user(s) with a game 106 using user account information (e.g., a user account identifier such as username and password).

In some implementations, online gaming server 102 or client devices 110 may include a game engine 104 or game application 112. In some implementations, game engine 104 may be used for the development or execution of games 106. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game applications 112 of client devices 110/116, respectively, may work independently, in collaboration with game engine 104 of online gaming server 102, or a combination of both.

In some implementations, both the online gaming server 102 and client devices 110 may execute a game engine (104 and 112, respectively). The online gaming server 102 using game engine 104 may perform some or all the game engine functions (e.g., generate physics commands, rendering commands, etc.), or offload some or all the game engine functions to game engine 104 of client device 110. In some implementations, each game 106 may have a different ratio between the game engine functions that are performed on the online gaming server 102 and the game engine functions that are performed on the client devices 110. For example, the game engine 104 of the online gaming server 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 102 and client device 110 may be changed (e.g., dynamically) based on gameplay conditions. For example, if the number of users participating in gameplay of a particular game 106 exceeds a threshold number, the online gaming server 102 may perform one or more game engine functions that were previously performed by the client devices 110.

For example, users may be playing a game 106 on client devices 110, and may send control instructions (e.g., user inputs, such as right, left, up, down, user election, or character position and velocity information, etc.) to the online gaming server 102. Subsequent to receiving control instructions from the client devices 110, the online gaming server 102 may send gameplay instructions (e.g., position and velocity information of the characters participating in the group gameplay or commands, such as rendering commands, collision commands, etc.) to the client devices 110 based on control instructions. For instance, the online gaming server 102 may perform one or more logical operations (e.g., using game engine 104) on the control instructions to generate gameplay instruction(s) for the client devices 110. In other instances, online gaming server 102 may pass one or more or the control instructions from one client device 110 to other client devices (e.g., from client device 110a to client device 110b) participating in the game 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 102. In other implementations, the control instructions may be sent from a client device 110 to another client device (e.g., from client device 110b to client device 110n), where the other client device generates gameplay instructions using the local game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that enable a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, the online gaming server 102 may store characters created by users in the data store 120. In some implementations, the online gaming server 102 maintains a character catalog and game catalog that may be presented to users. In some implementations, the game catalog includes images of games stored on the online gaming server 102. In addition, a user may select a character (e.g., a character created by the user or other user) from the character catalog to participate in the chosen game. The character catalog includes images of characters stored on the online gaming server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming server 102 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 102 as well as interact with online gaming server 102 (e.g., play games 106 hosted by online gaming server 102). As such, the game application may be provided to the client device(s) 110 by the online gaming server 102. In another example, the game application may be an application that is downloaded from a server.

In some implementations, each developer device 130 may include an instance of the game application 132, respectively. In one implementation, the game application 132 may permit a developer user(s) to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 130 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 132 may be an online gaming server application for users to build, create, edit, upload content to the online gaming server 102 as well as interact with online gaming server 102 (e.g., provide and/or play games 106 hosted by online gaming server 102). As such, the game application may be provided to the client device(s) 130 by the online gaming server 102. In another example, the game application 132 may be an application that is downloaded from a server. Game application 132 may be configured to interact with online gaming server 102 and obtain access to user credentials, user currency, etc. for one or more games 106 developed, hosted, or provided by a game developer.

In some implementations, a user may login to online gaming server 102 via the game application. The user may access a user account by providing user account information (e.g., username and password) where the user account is associated with one or more characters available to participate in one or more games 106 of online gaming server 102. In some implementations, with appropriate credentials, a game developer may obtain access to game virtual game objects, such as in-platform currency (e.g., virtual currency), avatars, special powers, accessories, that are owned by or associated with other users.

In general, functions described in one implementation as being performed by the online gaming server 102 can also be performed by the client device(s) 110, or a server, in other implementations if appropriate. In addition, the functionality attributed to a particular component can be performed by different or multiple components operating together. The online gaming server 102 can also be accessed as a service provided to other systems or devices through appropriate application programming interfaces (APIs), and thus is not limited to use in websites.

Figure 2:
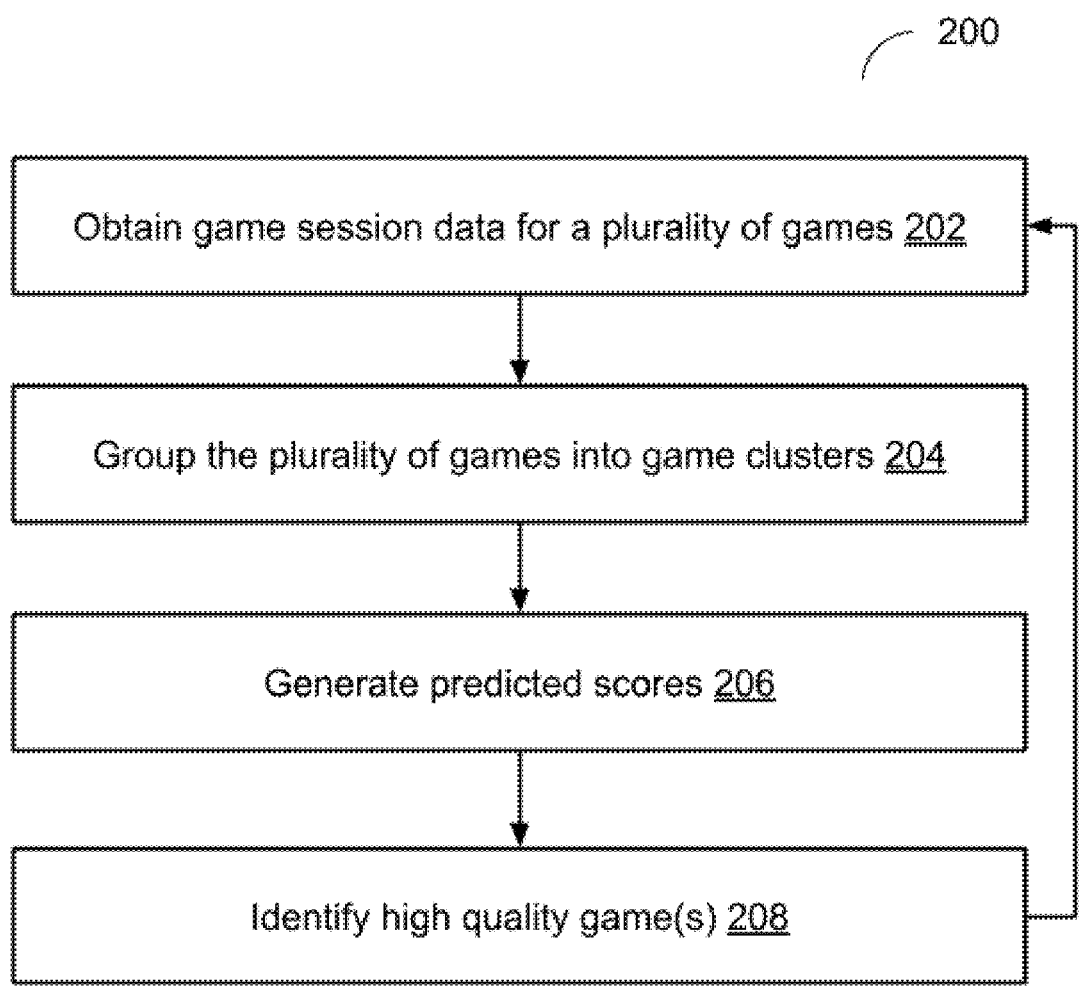
FIG. 2 is a flowchart illustrating an example method to generate a predicted score for a game, in accordance with some implementations.

FIG. 2 illustrates an example method 200 to identify high quality games.

In some implementations, method 200 can be implemented, for example, on gaming server 102 described with reference to FIG. 1. In some implementations, some or all of the method 200 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device.

Method 200 begins at block 202.

At block 202, game session data for a plurality of games is obtained. Game session may refer to a continuous period of time during which a game player participates in gameplay of a particular game or virtual environment. For example, game sessions may be of different session durations, e.g., 10 seconds, 5 minutes, 25 minutes, 3 hours, etc. Participation by a game player in the game session may include activities such as engaging in gameplay for specific games, such as solving puzzles, crossing hurdles, building structures, interacting with other game players, etc. Participation may also include passive participation, e.g., viewing a game in progress and optionally, engaging in chat communication with active players, etc. A session may be deemed over when a player logs out of the game (or game platform), or is inactive for at least a threshold amount of time.

Game sessions may be for single player games or multiplayer games. For a single player game, game session data may include a game identifier, a player identifier, and a session duration/length of time (e.g., a start time and an end time for the game session). For a multiplayer game, game session data may include a plurality of rows, each row including a game identifier, a respective player identifier, and respective session duration (respective length of time). In some implementations, game session data may also include a location associated with the game player; a level of the game player (e.g., a skill level for the game, an experience level for the game, etc.); age, gender, language, and other user profile information associated with the game player; etc.

For example, game session data may include a plurality of tuples as illustrated in the table below. One or more fields shown may be excluded, and other fields included in various implementations.

| Game ID | Player ID | Session start time | Session end time | Player Age | Level | Location |
|---|---|---|---|---|---|---|
| 1 | A | 08:00 am, Jan. 1, 2020 | 08:05 am, Jan. 1, 2020 | 16 | Master | Beijing |
| 1 | B | 08:10 am, Jan. 1, 2020 | 08:25 am, Jan. 1, 2020 | 15 | Beginner | Seoul |
| 1 | A | 09:00 am, Jan. 1, 2020 | 09:35 am, Jan. 1, 202- | 16 | Master | Beijing |
| 1 | C | 10:00 am, Jan. 1, 2020 | 11:00 am, Jan. 1, 2020 | 12 | Beginner | Bogota |
| 2 | D | 09:00 am, Jan. 1, 2020 | 09:01 am, Jan. 1, 2020 | 8 | — | Auckland |
| 2 | D | 10:00 am, Jan. 1, 2020 | 11:00 am, Jan. 1, 2020 | 15 | — | San Mateo |

Block 202 may be followed by block 204.

At block 204, the plurality of games are grouped into a plurality of game clusters. In some implementations, the grouping is based on the game session data. In some implementations, each game cluster may include one or more of the plurality of games. The grouping is performed such that each game of the plurality of games is part of a single cluster. In other words, the grouping is performed such that no game is in more than one cluster of the plurality of game clusters.

In some implementations, the game session data may be analyzed to determine a distribution of session durations for each game. For example, the distribution may be represented as a histogram that includes a plurality of bars, each bar corresponding to a particular session duration and representing the percentage of total game sessions of that session duration. For example, a game A may have 100 sessions, with 20 sessions each of duration 0-5 minutes, 5-10 minutes, 10-20 minutes, 20-30 minutes, and greater than 30 minutes. Another game B may have 1000 sessions with 990 sessions of less than 1 minute and 10 sessions of greater than or equal to 1 minute. In some implementations, the distribution may be represented as a continuous distribution of the percentage of total game sessions against the session duration.

In some implementations, the distribution may be a Weibull distribution. In these implementations, analyzing the game session data may include determining the parameters of the Weibull distribution, e.g., fitting a particular curve shape to the game session data. The parameters may include a shape parameter $k>0$ and a scale parameter $\lambda>0$.

In some implementations, the parameters of the Weibull distribution for a game are determined by fitting a life distribution model to a histogram of the game session data. The parameters k and λ determine the shape of the curve. For example, the shape parameter k is indicative of a relationship between a percentage of gameplay sessions that have a certain gameplay session duration and the duration of gameplay session. For example, the parameter k can be indicative of whether the percentage of sessions in a particular gameplay session duration bucket is relatively high for low gameplay session durations, whether the percentage of gameplay session duration is relatively high at the high gameplay session durations, or whether the percentage of gameplay session duration in a particular gameplay session duration bucket is distributed evenly over all gameplay session durations. The parameter $\lambda$ is indicative of a spread of the distribution of gameplay sessions.

Figure 3:
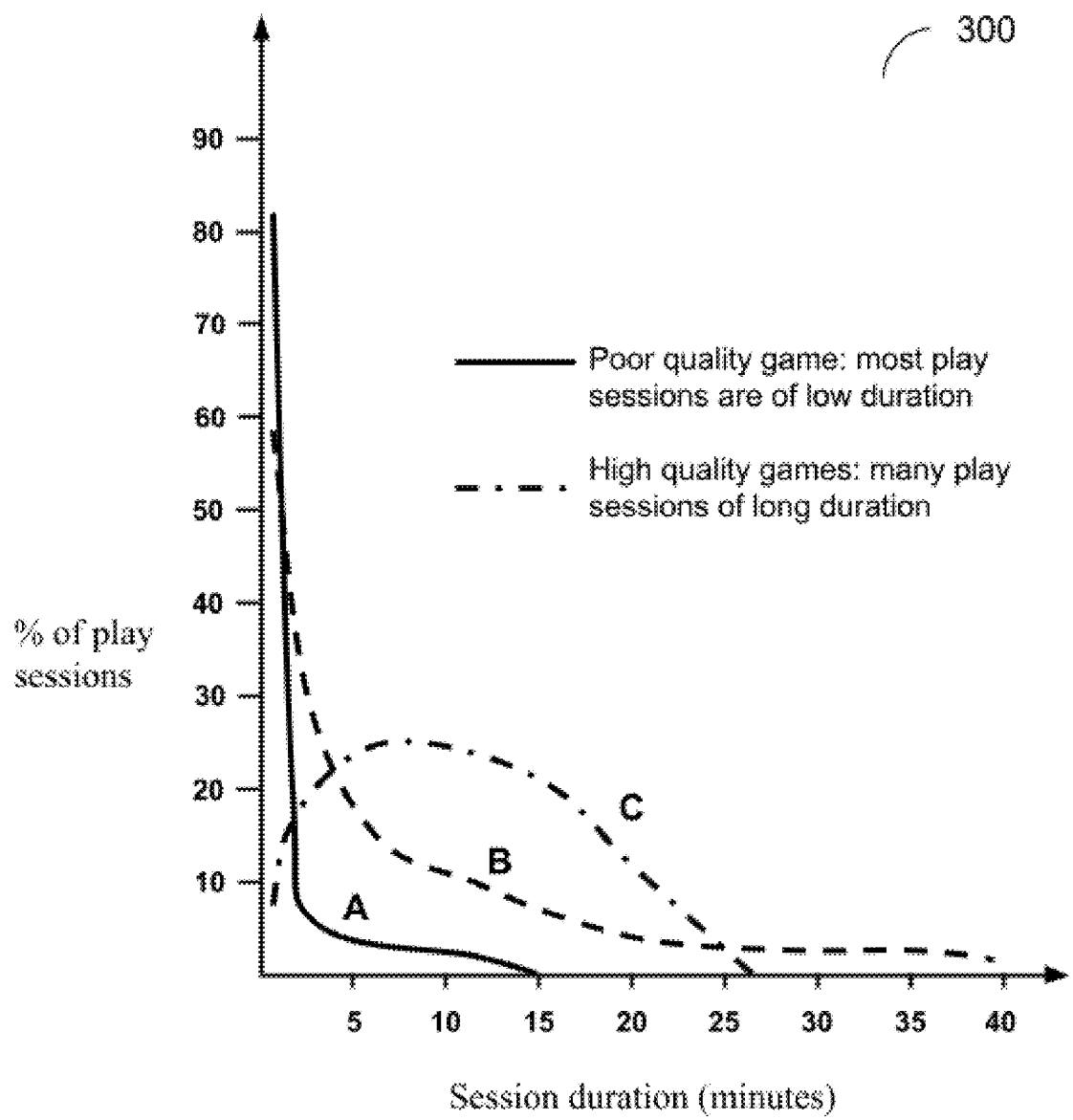
FIG. 3 illustrates an example distribution of gameplay session duration, in accordance with some implementations.

FIG. 3 illustrates examples of distributions for gameplay session durations for different games. In this illustrative example, three curves representing the distribution of gameplay session duration (length) for example games A, B, and C are depicted, each representing a distribution of gameplay session durations for the respective game. The X-axis represents gameplay session duration for the game, while the Y-axis represents the percentage of gameplay sessions for a game that lasted for the particular duration. Session durations can be measured at a high accuracy, e.g., down to seconds or fractions of seconds.

The distribution for game A depicts an example of a low quality game. As seen in FIG. 3, a large proportion of the gameplay sessions of game A (nearly 90%) are of low duration, e.g., less than 5 minutes (with a significant proportion of those being lower than 2 minutes). The curve falls rapidly, with only a very small percentage of gameplay sessions lasting for at least enough time (e.g., >5 minutes) to indicate that the player engaged in at least a threshold portion of the gameplay of the game prior to abandoning the game session. This may be indicative of a low quality game, where most players who start the game end the gameplay session relatively soon.

Games B (indicated by the dashed line) and C (indicated by the dash-dotted-line) are examples of higher quality games, with a higher proportion of gameplay sessions being played for a longer duration of game play.

The distribution is also indicative of other game characteristics. For example, while game B has a high proportion of game sessions that end in relatively short session durations (as seen in the initially declining portion of the curve, about 60% of gameplay sessions are of <5 minutes), a substantial proportion of game sessions of game B last long durations (as seen in the long tail of the curve, with some sessions lasting longer than 35 minutes). This curve indicates that while initial abandonment rate is high (e.g., which may be caused by a learning curve for the game, a mismatch between the user's expectations from the game and the actual gameplay, etc.), a significant proportion of players stay engaged in gameplay for longer durations, in contrast to game A, which has no sessions longer than 15 minutes.

In another example, game C has a relatively lower proportion of game sessions that end in short session durations (e.g., relatively low proportion of sessions end in <5 minutes, as seen in the initial rising portion of the curve) and a high proportion of sessions of medium duration (between 5-20 minutes). This may be, for example, be indicative of a complexity in game B or other barrier to entry, etc. that causes a higher percentage of players to end their gameplay sessions for game B relatively quickly (when compared to game C), but also that players who are able to overcome the barriers to entry (or master the complexities) in game B play longer sessions when compared to sessions of game C.

Different games may have differently shaped curves. The shape of the curve may be indicative of a quality of the game as well as other parameters of the game. For example, if users generally enjoy a game, the curve may include higher percentage of longer gameplay sessions (e.g., of durations 5 minutes or longer), than another game that is not enjoyable for many users (e.g., doesn't work, has no content, difficult to understand, etc.) which may have a curve with a very high percentage of short gameplay sessions (e.g., 90% sessions of less than 2 minutes).

Further, simpler games (e.g., simple puzzles) may have distributions of shorter gameplay durations (e.g., no session longer than 10 minutes and a large proportion of sessions of less than 5 minutes) than complex, multi-level games which may have sessions running into several minutes or hours.

Prior to the analyzing, the gameplay session data may be filtered to remove sessions that correspond to suspect user accounts, e.g., gameplay sessions that are associated with user accounts that are likely to be bots (non-human players). Such filtering can ensure that the game session data is representative of actual player behavior on the game platform.

In some implementations, grouping the plurality of games may be based on the distribution of session durations for each game, e.g., the value of the parameters k and $\lambda$ for a Weibull distribution. Games with similar values of the parameters may be grouped into a cluster, such that a plurality of clusters are formed. In some implementations, a similarity threshold may be used to perform the grouping.

In some implementations, a linear regression is utilized to estimate the parameters of the Weibull distribution. In some implementations, a two parameter Weibull distribution can be utilized to fit (model) the gameplay session duration data. In some implementations, a three parameter Weibull distribution can be utilized to fit the gameplay session duration data. In some implementations, other distribution functions, e.g. a Rice distribution, Rayleigh distribution, etc. can be utilized to model the gameplay session duration data.

Figure 4A:
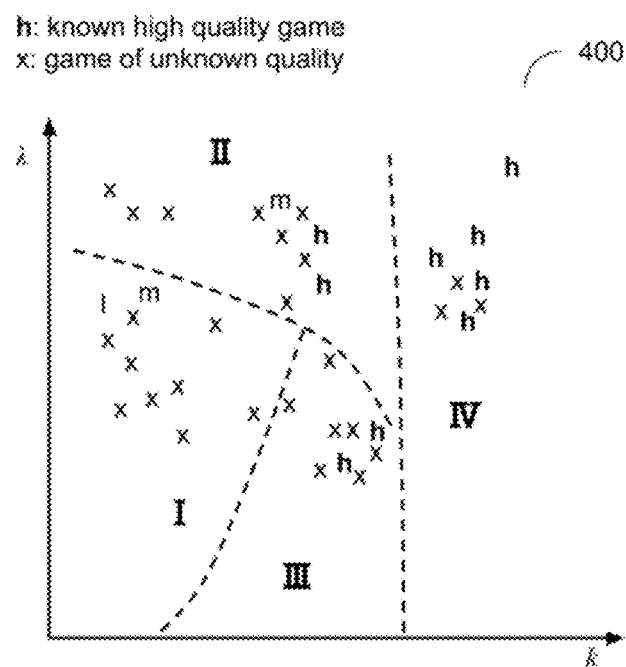
FIG. 4A is a diagram illustrating an example clustering of parameters of gameplay, in accordance with some implementations.

FIG. 4A illustrates an example of game clusters formed based on gameplay session duration data. In FIG. 4A, an example graph 400 is depicted showing clusters formed by plotting the distribution of the gameplay session data (for example, by plotting the determined k and $\lambda$ values for each game) and applying a clustering technique.

The clusters may be determined by identifying groups (clusters) of games where games within a cluster are more similar to each other than to games in other clusters.

In this illustrative example, the games are clustered into 4 clusters (depicted as I, II, III, and IV). The cluster boundaries are illustrated by the dashed lines. While FIG. 4 illustrates four clusters, in different implementations, any number of clusters may be formed. Games of known quality are depicted with corresponding letters (h=high; m=medium; l=low) and games for which the quality is not known are depicted with the letter x. While FIG. 4 illustrates three groups of ratings, in different implementations, games may be grouped into less (e.g., high and low) or more quality groups (e.g., games ranked 1-5 on a quality scale).

The clusters include games of unknown quality as well as games of known quality. Games within any of the particular clusters are similar to other games within the same cluster than they are to games located outside the cluster, in terms of the distribution of play session durations. While each game may have different parameters (for example for values of k and $\lambda$), the clustering partitions the games into clusters of games that share a similarity in their features. While FIG. 4A illustrates game clusters based on the parameters of a Weibull distribution, clusters may be formed based on gameplay session durations using any other distribution, or by application of a clustering algorithm, e.g., a machine-learning based clustering algorithm.

For example, a game included in cluster I bears greater similarity in session duration to other games in cluster I than to games that are included in clusters II, III, and IV. In this illustrative example, if the clusters are determined based on distribution parameters k and $\lambda$, a game that is included in cluster I can be characterized by distribution parameters that are closer to distribution parameters of other games included in cluster I, and farther from the distribution parameters of games included in clusters II, III, and IV.

Games of unknown quality included in a particular cluster have distribution parameters that are more similar to distribution parameters of high quality games that are also included in the particular cluster. Since the distribution parameters for a game are based on gameplay session data for the game (e.g. by determining a distribution for gameplay session durations), the gameplay session data for games of unknown quality included in a particular cluster is similar to gameplay session data of other games in the particular cluster.

In some implementations, grouping of the plurality of games may be performed using a machine learning model that implements a clustering technique. In these implementations, game session data is provided as input to the machine learning model which generates game clusters as its output. In some implementations, the machine learning model may be trained using unsupervised learning.

In some implementations, the ML model may be constrained to cluster the games into a predetermined number of clusters. In some implementations, the ML may be unconstrained, e.g. and may cluster the games into a suitable number of clusters based on the game parameters.

In some implementations, the ML model is a neural network. In some implementations, the ML model may include one or more of binary classification, multiclass classification, and regression. In some implementations, the machine learning model may be trained using supervised learning. In these implementations, known game clusters (e.g., identified by fitting a Weibull distribution curve for each game and grouping games with similar curves together) may be provided as training input along with the game session data. The machine learning model may be trained iteratively till it achieves sufficient accuracy in forming game clusters.

In some implementations, additional gameplay parameters may be used to form the clusters. In some implementations, the clusters may be multidimensional, e.g., 3-dimensional, 4-dimensional, etc. based on the particular game parameters used to determine the clusters. For example, such parameters can include: game type, age and/or gender of the user associated with the gameplay session, language of the user, language of the game, etc. In some implementations, the grouping of the plurality of games may be based on additional parameters. For example, such parameters may include game parameters such as a language or a game category for each of the plurality of games.

In some implementations, parameters associated with user profile information may also be utilized for the grouping of the plurality of games. For example, such parameters may include a total number of game sessions played, total games played, games played by a user for at least a threshold amount of time, whether the game player has purchased a game item associated with the game, whether the game player is a platform subscriber, etc.

Figure 4B:
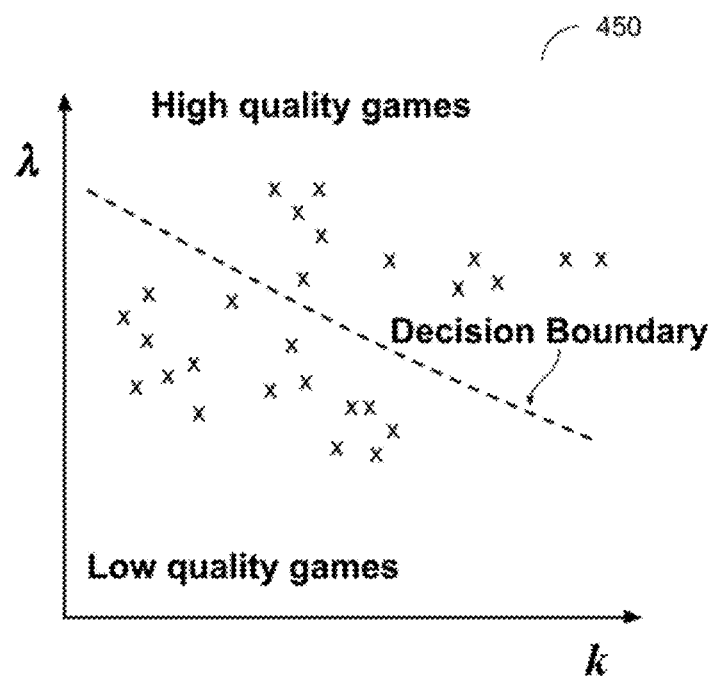
FIG. 4B is a diagram illustrating an example clustering of parameters of gameplay that uses logistic regression, in accordance with some implementations.

FIG. 4B is a diagram illustrating an example clustering of parameters of gameplay that is obtained using logistic regression, in accordance with some implementations.

In FIG. 4B, an example graph 450 is depicted that illustrates two clusters of games formed by plotting the distribution of the gameplay session data. For example, the distribution may be obtained based on determined k and λ values for each game and applying a logistic regression technique. The two clusters may represent, for example, high quality games and low quality games, separated by the decision boundary.

In some implementations, logistic regression is utilized to fit a logistic function to the gameplay session data, e.g. the Weibull parameters described above. An ML model is trained to optimally separate tagged good (high quality) and bad (low quality) games based on the k and λ Weibull parameters. A quality score is generated for each game based on a distance of the game from a linear boundary (decision boundary) that separates the games associated with each of the clusters.

The plurality of games are grouped into two game clusters separated by the decision boundary. A predicted store for a game of the plurality of games can then be determined based on a distance computed based on the k and λ parameters associated with the game and the decision boundary.

Block 204 may be followed by block 206. At block 206, a predicted score is generated for one or more of the plurality of games. In some implementations, method 200 may further include receiving quality scores for a subset of the plurality of games. The subset excludes one or more games. The quality scores may be determined based on various factors such as a popularity of the game (e.g., total number of players, active players per day, etc.), revenue generated by the game (e.g., via sale of in-game items, via subscription revenue, etc.), and/or other factors.

In some implementations, a tag may be utilized for a game that is indicative of its quality, e.g. high quality game, low quality game, etc. The tags may be derived from gameplay session data or from labels provided by human evaluators.

In some implementations, the predicted score for a game may be generated based on the cluster that the game belongs to. For example, if the game belongs to a cluster that includes other games that are associated with high quality scores, the game may be assigned a higher predicted score than another game that belongs to a cluster that includes other games with low quality scores. In some implementations, the predicted score may be based on known quality scores associated with other games in the cluster, e.g., a mean, median, or other statistical function of the quality scores. In some implementations, if there are no games with known quality scores in a particular cluster, the cluster may be merged with a nearest neighbor cluster.

In some implementations, generating the predicted score may be performed by applying a machine learning model. In these implementations, the machine learning model is trained to generate a predicted score for a game as follows. First, the machine learning model is provided with game session data and predicted scores for a subset of games for which quality scores are known (groundtruth), are obtained as output of the machine learning model. Next, feedback is provided to the machine learning model based on a comparison between the predicted scores and the quality scores for the subset of games. For example, the feedback may be calculated using any suitable function that takes the predicted scores and the quality scores as input. The machine learning model may be retrained periodically, e.g., when new datasets of groundtruth quality scores become available, when a certain number of days pass since the training, when a threshold number of new games are introduced on the game platform, when a threshold number of new game sessions are conducted, when a threshold number of new users join the game platform, etc.

The machine learning model is updated, e.g., weights of one or more nodes of a neural network are modified, or a connection between two or more nodes of the neural network is updated, based on the feedback. After the updating, the machine learning model is applied to another subset of games and further feedback is generated. The process of training the machine learning model in this manner can be continued until the predicted scores meet an accuracy threshold, e.g., match the groundtruth quality scores. After the training, the machine learning model is applied to games for which quality scores are not available to generate predicted scores.

Block 206 may be followed by block 208. In block 208, at least one game of the plurality of games is identified as a high quality game based on the predicted score. For example, the at least one game may be identified based on the predicted score meeting a threshold score.

Figure 6A:
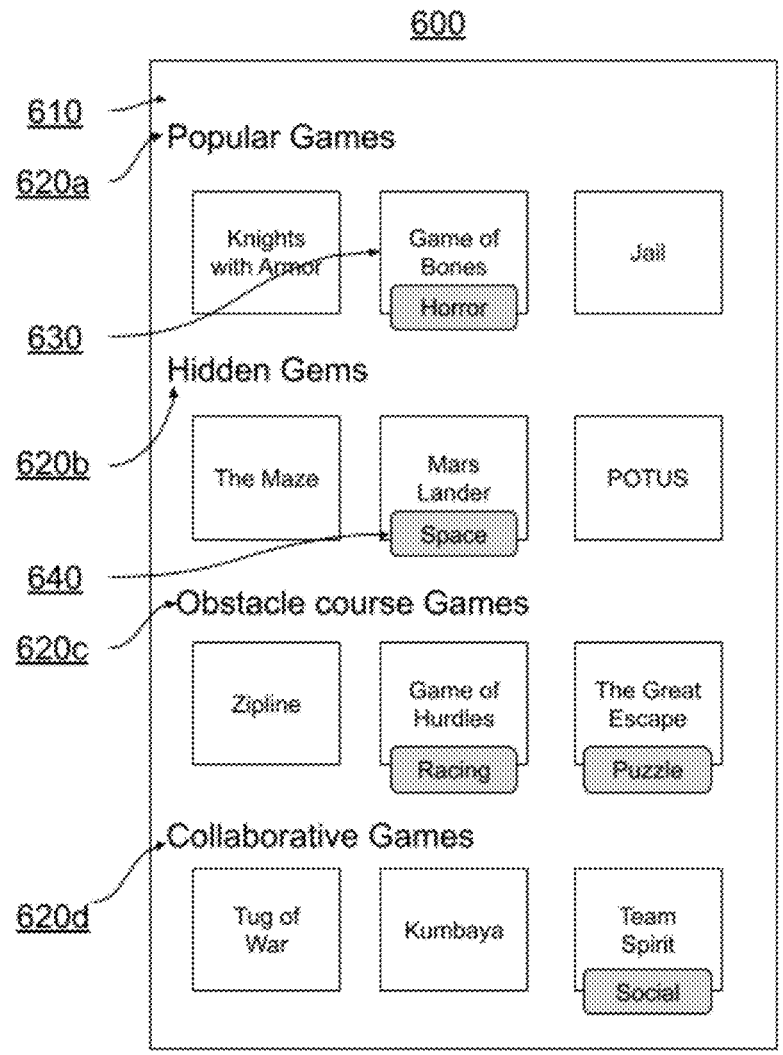
FIG. 6A illustrates an example listing of games arranged by categories, in accordance with some implementations.

In some implementations, method 200 may further include providing a user interface that includes the at least one game identified as the high quality game. For example, the user interface may be presented as a category of games, e.g., "hidden gems," that are not featured in other categories (e.g., "popular," "trending," "racing," "puzzle," etc.) In some implementations, a tag, e.g., "hidden gem," may be included for the at least one game whenever it is displayed in the user interface. An example user interface is depicted in FIG. 6A. The user interface is utilized to promote (highlight) one or more high quality games (e.g. "hidden gems") that the user may not otherwise discover on their own.

In some implementations, the user interface is provided to a particular game player. For example, a user interface may be generated for individual game players and may include one or more high quality games, identified based on the predicted score. In some implementations, user profile information of the particular game player may be taken into account in determination of the one or more high quality games to include in the user interface.

For example, high quality games as identified based on the predicted score determined using game session data may be included in the user interface if the particular game player meets an age threshold. Different age thresholds may be used for different games. For example, younger players may be provided games with relatively shorter game session duration while older players may be provided games with relatively longer game session durations, when the games are associated with similar quality scores.

In some implementations, the predicted score can also be used to rank games in a search or to create a sorted list of the games. In some implementations, the predicted scores may be utilized to remove from search results games that have play session distributions that match low-quality games. For example, a game may have a large number of botted game sessions and its gameplay data that considers a number of game play sessions may place it in a category of "Trending" or "Popular games." If such a game has a low predicted score (for example, due to its gameplay session data being similar to other low quality games), it may be placed lower in the search or removed from the search results, and/or flagged for additional investigation.

Figure 5:
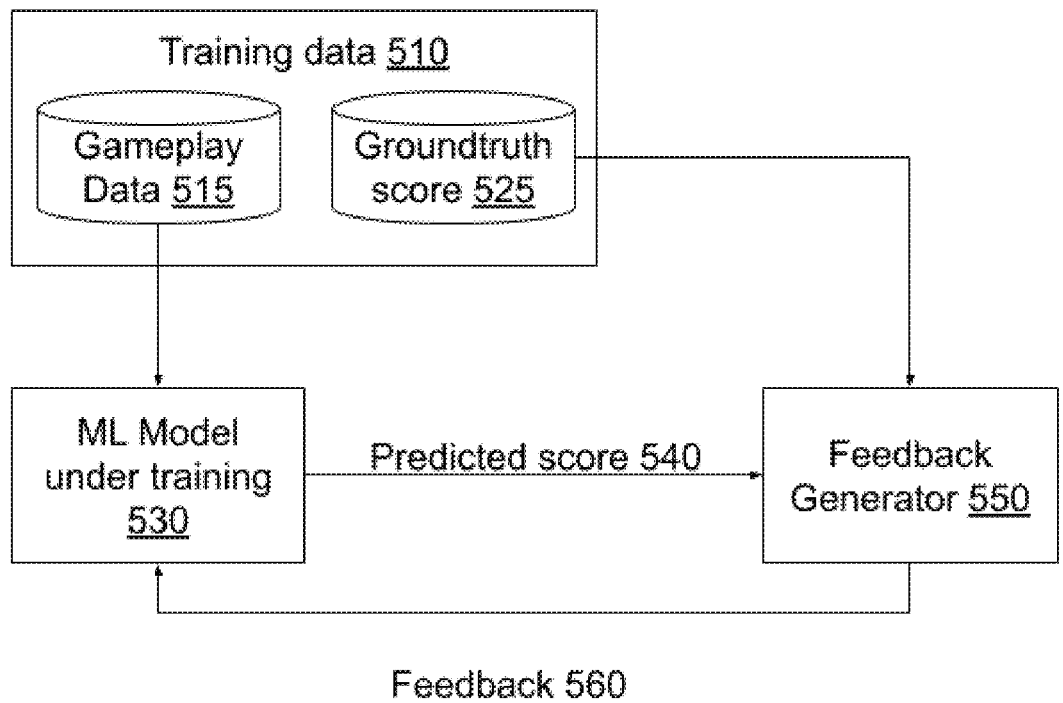
FIG. 5 is a block diagram illustrating an example of supervised machine learning (ML) to generate a predicted score for a game, in accordance with some implementations.

FIG. 5 is a block diagram illustrating an example of supervised machine learning (ML) to generate predicted scores for games, in accordance with some implementations.

The supervised learning can be implemented on a computer that includes one or more processors and memory with software instructions. In some implementations, the one or more processors may include one or more of a general purpose central processing unit (CPU), a graphics processing unit (GPU), a machine-learning processor, an application-specific integrated circuit (ASIC), a field-programmable gate array (FPGA), or any other type of processor.

In this illustrative example, supervised learning is used to train a machine learning (ML) model 530 based on training data 510 and a feedback generator 550. ML model 530 may be implemented using any suitable machine learning technique, e.g., a feedforward neural network, a convolutional neural network, or any other suitable type of neural network. In some implementations, other machine learning techniques such as Bayesian models, support vector machines, hidden Markov models (HMMs), etc. can also be used to implement ML model 530.

The training data 510 includes gameplay data 515 and groundtruth scores (or equivalent quality ratings) 525 for a plurality of games. The gameplay data may include any gameplay data, e.g., gameplay session data described with respect to FIG. 2. The groundtruth scores and/or quality ratings may be obtained from scores provided by the developers of the games, game players, or other human users.

In this illustrative example, gameplay data 515 are provided to a machine learning (ML) model under training 530. The ML model generates a predicted score 540 based on a current state of the ML model and the gameplay data, e.g. distribution parameters for each game and/or other game, and/or player parameters. For example, the ML model may determine a feature vector (or embedding) based on features of gameplay data 515. The feature vector (or embedding) may be a mathematical, multi-dimensional representation generated based on the gameplay data 515. Different games may have different feature vectors, based on respective gameplay data. Upon training, the ML model generates similar feature vectors for similar games (games that are associated with similar types of gameplay data).

ML model 530 may generate a predicted score for the game based on the gameplay data associated with the game, e.g., based on the feature vector, and/or based on similarity with feature vectors of other games and quality scores associated with those other games.

The predicted score 540 generated by ML model 530 is provided to feedback generator 550.

Feedback generator 550 is also provided with the groundtruth scores 525 (e.g., human-curated scores) corresponding to the game. Feedback 560 is generated by feedback generator 550 based on a comparison of the predicted score with the groundtruth score. For example, if predicted score 540 is within a predetermined threshold distance of a groundtruth score 525, positive feedback may be provided as feedback 560, while if the scores are far apart and outside a threshold distance, negative feedback is provided to the ML model under training, which may be updated based on the received feedback using reinforcement learning techniques.

In some implementations, the ML model includes one or more neural networks. The neural network(s) may be organized into a plurality of layers including a plurality of layers. Each layer may comprise a plurality of neural network nodes. Nodes in a particular layer may be connected to nodes in an immediately previous layer and nodes in an immediately next layer. In some implementations, the ML model may be a convolutional neural network (CNN).

The training of the ML model may be performed periodically at specified intervals, or may be triggered by events. In some implementations, the training may be repeated until a threshold level of text tag prediction accuracy is reached.

FIG. 6A illustrates an example listing of games arranged by categories, in accordance with some implementations. The listing is displayed via a user interface that includes different games available on a game platform to a user.

Game lists may be generated (for example, by online gaming server 102) from available games on a game platform to enable game selection by users. Statistics of gameplay, number of users playing different games, engagement level of users, game types, etc. may be utilized to determine game popularity.

In some implementations, categories (620a-620d) of games may be promoted (highlighted) to users. Example categories may include popular games (620a), obstacle course games (620c), and collaborative games (620d), etc. A "Hidden Gems" category (620c) that includes games with high predicted scores (as determined, for example, by the techniques described with reference to FIG. 2) may also be surfaced to the user. In some implementations, the promoted games may also be based on user-specific factors. For example, games with longer gameplay durations may be promoted to older users while games with relatively shorter durations may be promoted to younger users.

Each category may include a list of individual games (for example, 630). Individual games may also be annotated with tags (640) that may be displayed along with an icon or other display associated with a game. In some implementations, the game lists may be provided on an initial display of a user device via a user interface.

Games may also be associated with tags indicative of features associated with and included in the games. For example, games may be associated with tags such as tycoon game, obstacle course game, first person shooter game, collaborative game, social game, etc. that can enable a user to obtain additional information about the type of game. Multiple tags may be associated with games that are associated with a first category and games with a second tag can be associated with multiple categories. For example, a category of games titled "Racing Games" may include games with example tags "city race," "jungle race," "desert race," "camel race," etc.

Highlighting games may enable users to easily browse available games, discover game(s) of interest to them, and make a selection of their preferred game from available games on the platform.

Figure 6B:
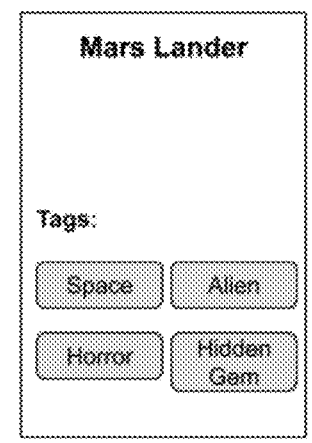
FIG. 6B illustrates an example game listing, in accordance with some implementations.

FIG. 6B illustrates an example game listing, in accordance with some implementations. In this illustrative example, the user interface (UI) displays a game or game icon along with all its associated tags. With this UI view, a participant may browse game details and obtain information about all the tags associated with the game. A "Hidden Gem" tag may be included with a game identified as a high quality game as described earlier.

Figure 6C:
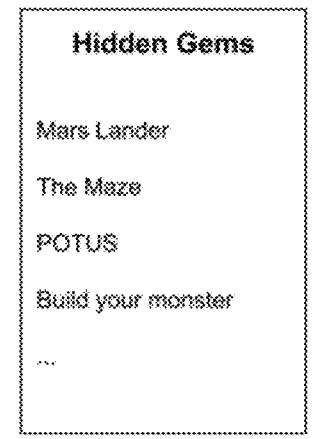
FIG. 6C illustrates another example of a game listing, in accordance with some implementations.

FIG. 6C illustrates another example of a game listing, in accordance with some implementations. In this illustrative example, the user interface displays a list of all or multiple games (or game icons) that are associated with a "Hidden Gem" tag. This UI view can enable a participant to browse for such games.

Figure 7:
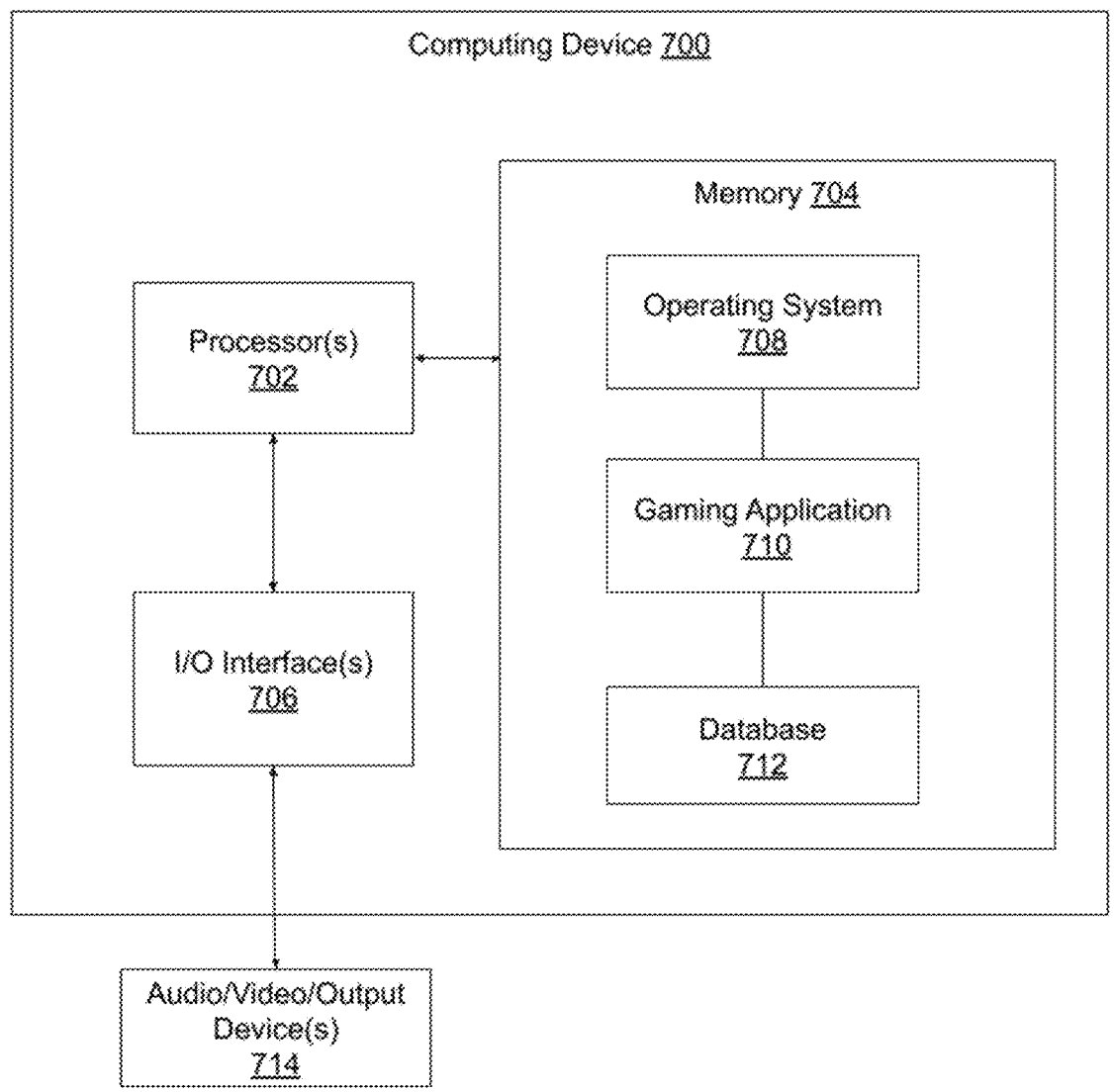
FIG. 7 is a block diagram illustrating an example computing device, in accordance with some implementations.

FIG. 7 is a block diagram of an example computing device 700 which may be used to implement one or more features described herein. In one example, device 700 may be used to implement a computer device (e.g. 102 and/or 110 of FIG. 1), and perform appropriate method implementations described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 700 includes a processor 702, a memory 704, input/output (I/O) interface 706, and audio/video input/output devices 714.

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, e.g., an audio spatialization application and application data 712. In some implementations, application 710 can include instructions that enable processor 702 to perform the functions (or control the functions of) described herein, e.g., some or all of the methods described with respect to FIG. 2.

For example, applications 710 can include an audio spatialization module 712, which as described herein can provide audio spatialization within an online gaming server (e.g., 102). Elements of software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 120), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 714 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 7 shows one block for each of processor 702, memory 704, I/O interface 706, and software blocks 708 and 710. These blocks may represent one or more processors or processing circuitries, operating systems, memories, I/O interfaces, applications, and/or software engines. In other implementations, device 700 may not have all of the components shown and/or may have other elements including other types of elements instead of, or in addition to, those shown herein. While the online gaming server 102 is described as performing operations as described in some implementations herein, any suitable component or combination of components of online gaming server 102 or similar system, or any suitable processor or processors associated with such a system, may perform the operations described.

A user device can also implement and/or be used with features described herein. Example user devices can be computer devices including some similar components as the device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 200) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
obtaining, by a hardware processor, game session data that includes a respective session duration for each game session of a plurality of game sessions, each game session associated with a respective game of a plurality of games of unknown quality and a respective game player;
grouping, by the hardware processor and by applying a machine learning model, the plurality of games of unknown quality into a plurality of game clusters based on the game session data, each game cluster including one or more of the plurality of games of unknown quality such that no game is in more than one cluster of the plurality of game clusters, wherein the game session data are generated based on gameplay activity of users engaged in the game on a gaming platform and are stored by the gaming platform, and wherein the machine learning model is constrained to cluster the plurality of games of unknown quality into a predetermined number of game clusters;
identifying, for each game cluster, at least one game of known quality, wherein the at least one game of known quality has a similar distribution of session durations to a distribution of session durations of the one or more of the plurality of games of unknown quality;
generating, using the machine learning model, a predicted score for one or more of the plurality of games of unknown quality based on a quality score associated with the at least one game of known quality in a corresponding game cluster;
identifying at least one game of the plurality of games of unknown quality as a high quality game based on the predicted score; and
providing, to a client device, by the gaming platform, for display by the client device, a user interface that includes a listing of games including a category of high quality games and wherein the listing of games includes the at least one game identified as the high quality game.

2. The method of claim 1, further comprising:
analyzing the game session data to determine the distribution of session durations for each game based on a percentage of game sessions that are associated with a respective length of time, and wherein the grouping of the plurality of games of unknown quality is based on the distribution of session durations.

3. The method of claim 2, wherein the distribution of session durations for each game is a two parameter Weibull distribution, and wherein the analyzing comprises determining a non-negative shape parameter and a non-negative scale parameter of the two parameter Weibull distribution.

4. The method of claim 1, further comprising:
receiving quality scores for a plurality of games of known quality for each game cluster; and
wherein generating the predicted score for each game is based on a particular cluster that the game of unknown quality belongs to and a statistical function of the quality scores associated with the games of known quality in the particular cluster.

5. The method of claim 1, further comprising:
receiving quality scores for a subset of the plurality of games of unknown quality wherein the subset excludes at least one of the plurality of games of unknown quality; and
training the machine learning model using supervised learning, wherein feedback is provided to the machine learning model based on a comparison between a predicted score for each game in the subset and the quality score for each game in the subset.

6. The method of claim 1,
wherein the listing of high quality games comprises games that are not included in any other category.

7. The method of claim 1, wherein the game session data further includes at least one of a game player location, a game player skill level, and a game player age, and providing the user interface is performed for a particular game player and wherein the at least one game is included in the user interface based at least in part on at least one of the game player age, the game player skill level, and the game player location associated with a user account of the particular game player.

8. The method of claim 1, wherein the grouping the plurality of games of unknown quality comprises grouping the plurality of games of unknown quality into two game clusters separated by a decision boundary, and wherein generating the predicted score for each of the one or more of the plurality of games of unknown quality comprises determining a distance between the each game and the decision boundary, wherein the distance is based on two or more parameters associated with the each game, the parameters being based on the game session data for the each game.

9. The method of claim 1, wherein the grouping is further based on one or more of: an age, a location, a gender, or a language associated with a game player for each game session.

10. The method of claim 1, further comprising:
identifying at least one game of the plurality of games as a low quality game based on the predicted score; and
excluding the at least one game identified as the low quality game from the user interface.

11. A computing device comprising:
a processor; and
a memory coupled to the processor, with instructions stored thereon that, when executed by the processor, cause the processor to perform operations comprising:

obtaining, by the processor, game session data that includes a respective session duration for each game session of a plurality of game sessions, each game session associated with a respective game of a plurality of games of unknown quality and a respective game player;
grouping, by the processor and by applying a machine learning model, the plurality of games of unknown quality into a plurality of game clusters based on the game session data, each game cluster including one or more of the plurality of games of unknown quality such that no game is in more than one cluster of the plurality of game clusters, wherein the game session data are generated based on gameplay activity of users engaged in the game on a gaming platform and are stored by the gaming platform, and wherein the machine learning model is constrained to cluster the plurality of games of unknown quality into a predetermined number of game clusters;
identifying, for each game cluster, at least one game of known quality, wherein the at least one game of known quality has a similar distribution of session durations to a distribution of session durations of unknown quality;
generating, using the machine learning model, a predicted score for one or more of the plurality of games of unknown quality based on a quality score associated with the at least one game of known quality in a corresponding game cluster;
identifying at least one game of the plurality of games of unknown quality as a high quality game based on the predicted score; and
providing, to a client device, by the gaming platform, for display by the client device, a user interface that includes a listing of games including a category of high quality games and wherein the listing of games includes the at least one game identified as the high quality game.

12. The computing device of claim 11, wherein the operations further comprise:
analyzing the game session data to determine the distribution of session durations for each game based on a percentage of game sessions that are associated with a respective length of time, and wherein the grouping of the plurality of games of unknown quality is based on the distribution of session durations.

13. The computing device of claim 12, wherein the distribution of session durations for each game is a two parameter Weibull distribution, and wherein the analyzing comprises determining a non-negative shape parameter and a non-negative scale parameter of the Weibull distribution.

14. The computing device of claim 11, wherein the operations further comprise:
receiving quality scores for a plurality of games of known quality for each game cluster; and
wherein generating the predicted score for each game is based on a particular cluster that the game of unknown quality belongs to and a statistical function of the quality scores associated with the games of known quality in the particular cluster.

15. The computing device of claim 11, wherein the grouping the plurality of games of unknown quality comprises grouping the plurality of games into two game clusters separated by a decision boundary, and wherein generating the predicted score for each of the one or more of the plurality of games of unknown quality comprises determining a distance between the each game and the decision boundary, wherein the distance is based on two or more parameters associated with the each game, the parameters being based on the game session data for the each game.

16. The computing device of claim 15, wherein the operations further comprise:
receiving quality scores for a subset of the plurality of games of unknown quality wherein the subset excludes at least one of the plurality of games of unknown quality; and
training the machine learning model using supervised learning, wherein feedback is provided to the machine learning model based on a comparison between a predicted score for each game in the subset and the quality score for each game in the subset.

17. A non-transitory computer-readable medium comprising instructions that, responsive to execution by a processing device, causes the processing device to perform operations comprising:
obtaining, by the processing device, game session data that includes a respective session duration for each game session of a plurality of game sessions, each game session associated with a respective game of a plurality of games of unknown quality and a respective game player;
grouping, by the processing device and by applying a machine learning model, the plurality of games of unknown quality into a plurality of game clusters based on the game session data, each game cluster including one or more of the plurality of games of unknown quality such that no game is in more than one cluster of the plurality of game clusters, wherein the game session data are generated based on gameplay activity of users engaged in the game on a gaming platform and are stored by the gaming platform, and wherein the machine learning model is constrained to cluster the plurality of games of unknown quality into a predetermined number of game clusters;
identifying, for each game cluster, at least one game of known quality, wherein the at least one game of known quality has a similar distribution of session durations to a distribution of session durations of unknown quality;
generating, using the machine learning model, a predicted score for one or more of the plurality of games of unknown quality based on a quality score associated with the at least one game of known quality in a corresponding game cluster;
identifying at least one game of the plurality of games of unknown quality as a high quality game based on the predicted score; and
providing, to a client device, by the gaming platform, for display by the client device, a user interface that includes a listing of games including a category of high quality games and wherein the listing of games includes the at least one game identified as the high quality game.

18. The non-transitory computer-readable medium of claim 17, wherein the operations further comprise:
analyzing the game session data to determine the distribution of session durations for each game based on a percentage of game sessions that are associated with a respective length of time, and wherein the grouping of the plurality of games of unknown quality is based on the distribution of session durations.

19. The non-transitory computer-readable medium of claim 17, wherein the grouping the plurality of games of unknown quality comprises grouping the plurality of games into two game clusters separated by a decision boundary, and wherein generating the predicted score for each of the one or more of the plurality of games of unknown quality comprises determining a distance between the each game and the decision boundary, wherein the distance is based on two or more parameters associated with the each game, the parameters being based on the game session data for the each game.

20. The non-transitory computer-readable medium of claim 18, wherein the distribution of session durations for each game is a two parameter Weibull distribution, and wherein the analyzing comprises determining a non-negative shape parameter and a non-negative scale parameter of the Weibull distribution.

* * * * *